United States Patent [19]
Nakamura

[11] Patent Number: 5,984,320
[45] Date of Patent: Nov. 16, 1999

[54] TOOL CHUCK

[76] Inventor: Daijiro Nakamura, 552-2, Shimokishi-cho, Ono-shi Hyougo Prefecture, 675-13, Japan

[21] Appl. No.: 09/101,933
[22] PCT Filed: Jan. 6, 1997
[86] PCT No.: PCT/US97/00227
  § 371 Date: Dec. 4, 1998
  § 102(e) Date: Dec. 4, 1998
[87] PCT Pub. No.: WO97/27020
  PCT Pub. Date: Jul. 31, 1997

[30] Foreign Application Priority Data

Jan. 22, 1996 [JP] Japan ......................... 8-28634

[51] Int. Cl.$^6$ ..................................................... B23B 31/12
[52] U.S. Cl. ............................. 279/62; 279/140; 279/902
[58] Field of Search ................................ 279/60–65, 140, 279/902

[56] References Cited

U.S. PATENT DOCUMENTS

| | | | |
|---|---|---|---|
| 2,784,976 | 3/1957 | Ondeck | 279/902 |
| 3,894,743 | 7/1975 | Hiroumi | 279/140 |
| 4,423,881 | 1/1984 | Whitehead | 279/62 |
| 5,044,643 | 9/1991 | Nakamura | 279/902 |
| 5,261,679 | 11/1993 | Nakamura | 279/62 |
| 5,411,275 | 5/1995 | Huff et al. | 279/62 |

FOREIGN PATENT DOCUMENTS 404210308  7/1992  Japan ....................... 279/902

*Primary Examiner*—Steven C. Bishop

[57] ABSTRACT

This invention has the purpose of providing a tool chuck which in addition to being able to clamp powerfully using the grip of a hand only, does not loosen with its grip with a vibrating load. A tool chuck is provided which transmits the rotational force of an operating ring fitted over the chuck body to a nut ring, slides the chuck jaws in the direction of opening and closing, gripping the tool with the closing motion of said chuck jaws, and characterized in fitting and fixing an input ring into the inner surface opposing the nut ring of said operating ring, fitting a thrust bearing between the inner side of said input ring and the chuck body which positions a ball holder on the chuck body side, forming a ball thread between the inner surface of said input ring and the outer surface of the nut ring opposing this which screw feeds the nut ring in the direction of thrust by means of balls held in a retainer through the rotation of the input ring in the direction of clamping, engaging the inner edge of said nut ring and the inner surface of said ball holder, and providing a return spring between said operating ring and nut ring which returns the nut ring when the clamping load is released from the nut ring.

1 Claim, 4 Drawing Sheets

TOOL CHUCK

DETAILED DESCRIPTION

1. Technical Field of the Invention

This invention relates to a tool chuck which grips tools such as the drill bit of an electric drill or the driver bit of an electric screwdriver.

2. Prior Art

There are various examples in prior art of tool chucks which can be powerfully clamped using the grip of a hand and without using a chuck handle (for example, Japanese Patent Application Nos. 2-80395 and 2-213245), but if these are exposed to continuous strong vibration during work, the grip of the chuck is frequently loosened.

Problems to be Resolved by the Invention

This invention has the purpose of providing a tool chuck which in addition to being able to clamp powerfully using the grip of a hand only, does not loosen its grips with a vibrating load.

Means of Resolving the Difficulties

This invention is characterized in being a tool chuck which in addition to being a tool chuck provided at the center of the chuck body with a plurality of chuck jaws set obliquely and able to slide open and shut, has a partial male thread engraved around the outside of said chuck jaws, and is provided with a nut ring which screws onto this partial male thread and which screw feeds said chuck jaws in the direction of opening and closing, the rotational force of an operating ring fitted onto said chuck body being transmitted to said nut ring, each chuck jaw sliding in the direction of opening and closing, the tool being gripped by the closing of said chuck jaws, an input ring being fitted into and fixed to the inner surface of said operating ring facing the nut ring, a thrust ring being fitted between the inner side of said input ring and the chuck body which positions a ball holder on the chuck body side, a ball thread being formed between the inner face of said input ring and the outer face of the nut ring opposing it, which screw feeds the nut ring in the direction of thrust upon rotation of the input ring in the direction of clamping by means of the balls held in a retainer, the inner end of said nut ring engaging with the inner surface of said ball holder, and having a return spring fitted between said operating ring and nut ring, and which returns said nut ring when the clamping load of the nut ring is released.

When the tool chuck of the invention firmly grips a tool, up until the chuck jaws close on the tool, the rotation of the operating ring rotates the nut ring with the retaining force of the return spring sliding the jaws in the direction of closing, thus gripping the tool.

As the tool is gripped, the rotational resistance of the nut ring becomes larger, and when the rotation stops, the subsequent rotation of the operating ring is converted into screw feed of the ball thread formed between the input ring and the nut ring.

In other words, with the cessation of rotation of the nut ring, a relative rotation occurs with the input ring which rotates integrally with the operating ring and the nut ring, and the rotation of the input ring creates a rolling movement which causes the balls in the ball thread to roll around the thread grooves, and by the movement of these balls the nut ring screw feeds and pushes outward.

With the screw feed of the above ball thread, since the ball thread is formed in the outside of the nut ring, the thread gauge of said ball thread can be made large, and for this reason the thread angle can be made small. As a result, since a small amount of screw feed is obtained from a large amount of rotation of the input ring, the ratio of the amount of nut ring screw feed to the amount of rotation of the input ring can be made large, resulting in a large amount of torque being obtained.

In addition, the rolling movement of the balls in said ball thread involves rolling of the balls, so with screw feed of the nut ring carried out with balls rotated with a ½ rotation of the input ring, since the balls roll around there is no loss in the rotation input from the input ring (the efficiency of rotation transmission is good) and a great increase in torque can be obtained.

With the increased torque obtained by this effect, the nut ring is forcefully thrust out, and with this thrust the chuck jaws are able to grip powerfully. In other words, since the chuck jaws are set obliquely, a wedge effect occurs in the chuck jaws and due to this wedge effect the tool can be gripped (clamped) with a powerful force.

With a tool gripped in the fashion described above, even if the chuck is exposed to vibration, the nut ring is retained by the ball holder of the thrust bearing and prevented from rotating, and moreover the ball holder is pushed up against the chuck body and fixed as the input ring takes the reaction to the pushing out of the nut ring, and as a result the nut ring is in a state where its rotation is locked, so even if vibration is applied to the chuck, the nut ring will not rotate and loosen with vibration and it is possible to maintain a powerfully clamped state.

When releasing the gripping of the tool, it is sufficient to reverse the operation of the above clamping operation, and when the clamping load on the nut ring is released, the said nut ring is returned to its original position by the return spring.

The above effect, according to the invention, means that the tool can be powerfully clamped without using a chuck handle due to the enhanced power of the nut ring.

Moreover, this enhanced power allows a strong torque to be obtained since the thread angle of the ball threads is small and the ratio of the amount of nut ring screw feed to the amount of rotation of the input ring is large. In addition power is enhanced by the efficient transmission of rotation and absence of rotational loss due to the rolling of the balls in the ball thread, thus creating a powerfully enhanced grip.

Furthermore, when using a gripped tool, the rotation of the nut ring is locked and so even if vibration is applied, and even if continuous vibrational load is present, there is no loosening of the clamping of the tool and it is effective in such cases as work which creates vibration such as drilling a concrete wall.

DETAILED DESCRIPTION OF A PREFERRED EMBODIMENT

An embodiment of the invention will now be described in detail on the basis of the drawings that follow.

The drawings show a tool chuck which grips the drill bit of an electric drill or the driver bit of an electric screwdriver or the like, and moreover show a tool chuck which can be clamped without using a chuck handle.

Figure 1:
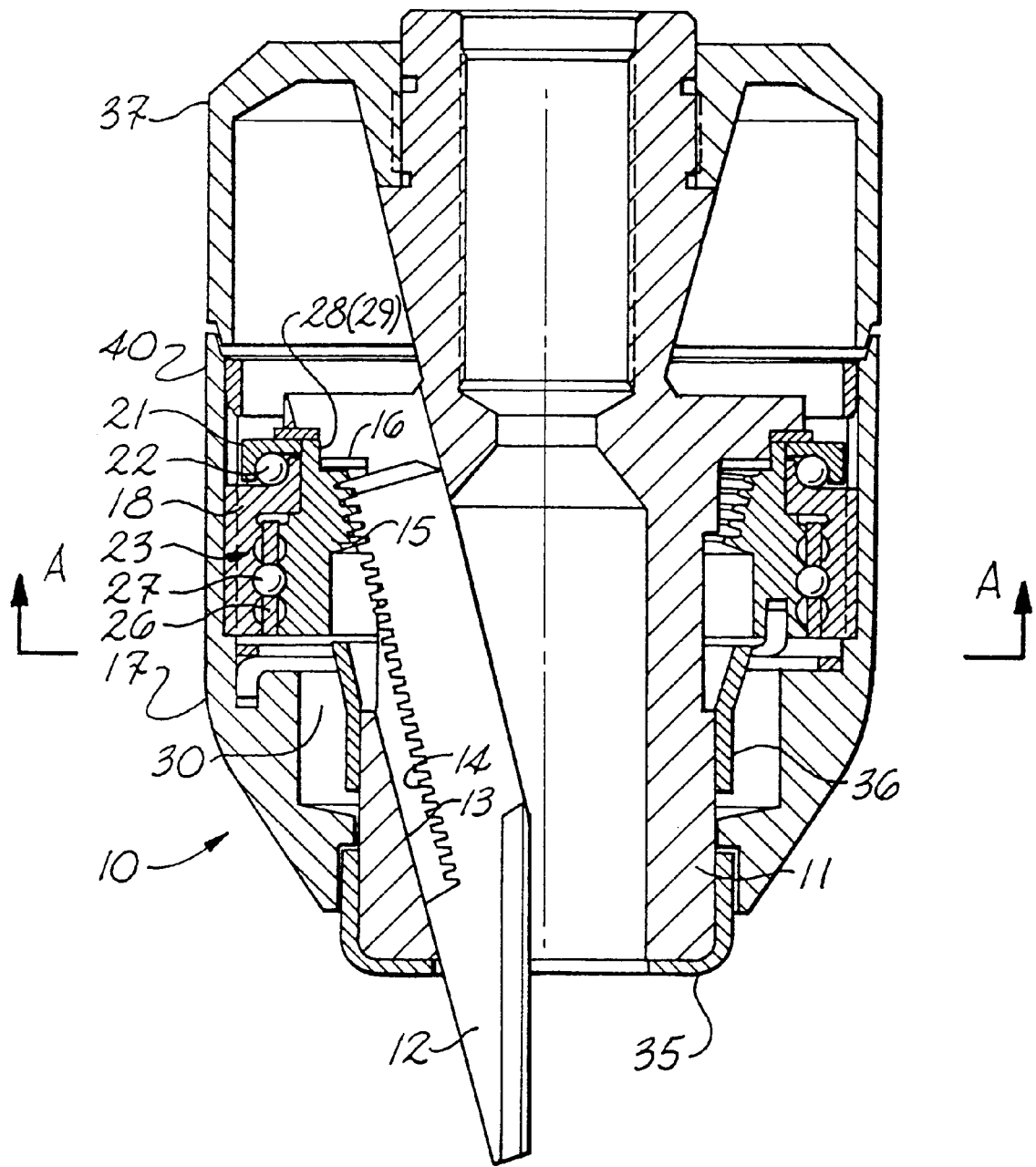
FIG. 1 is a cross section of tool chuck.
Figure 2:
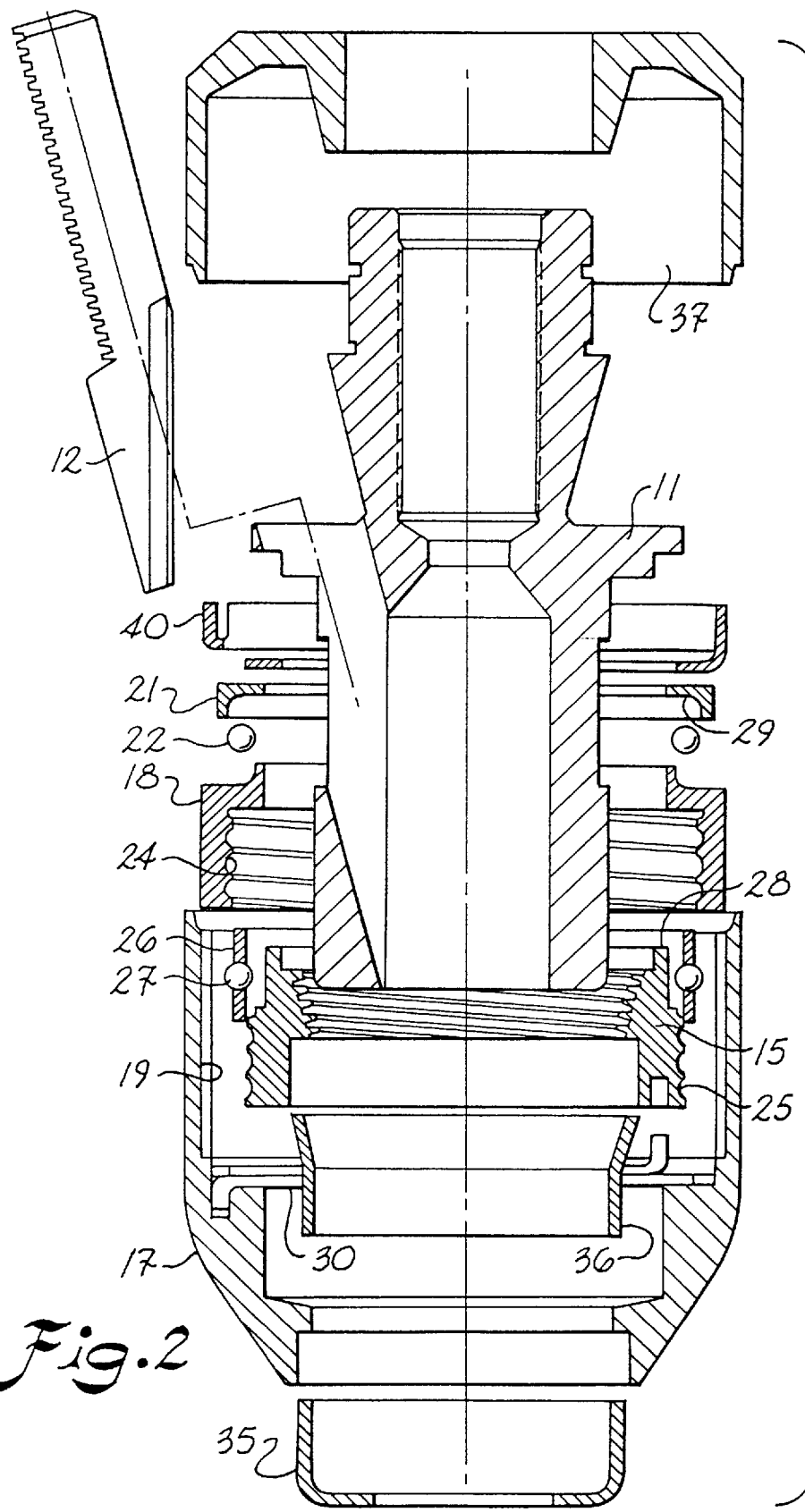
FIG. 2 is an exploded cross section of tool chuck.

In FIG. 1, tool chuck 10 is provided with three chuck jaws 12 at the center of the tip of chuck body 11, these being provided in an oblique shape which come together at the tip with respect to the shaft of chuck body 10 and moreover are able to slide open and shut. In other words said three chuck jaws 12 are inserted so as to only slide freely within slide grooves 13 formed respectively in an oblique shape with respect to the axis of chuck body 11.

On the outside of the inner end of said chuck jaws 12 are engraved partial male threads 14 in such a way that they are respectively continuous, these partial male threads 14 engaging with a female thread 16 engraved on the inner surface of the conical part of a cylindrical nut ring 15, said nut ring 15 being supported so as to rotate around the outer surface of chuck body 11, and by applying a forward and reverse rotation to this nut ring 15, chuck jaws 12 are slid open and shut by screw feed, thus enabling the tool to be gripped or released.

On the outer surface of said nut ring 15 is fitted operating ring 17 so as to freely rotate and covering the central part from the front of chuck body 11, input ring 18 being fitted and fixed to the inner surface of said operating ring 17 opposing nut ring 15.

Figure 3:
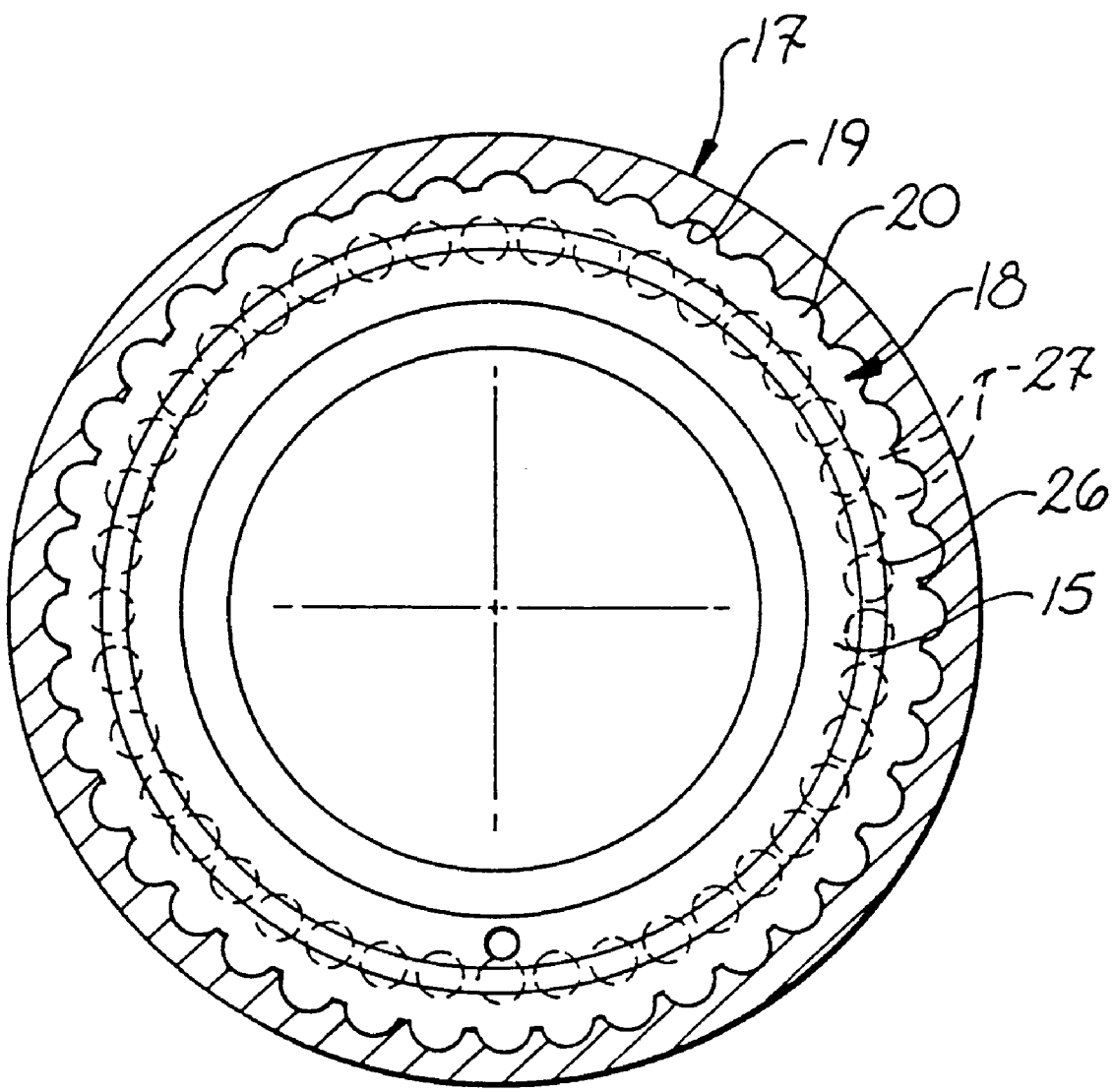
FIG. 3 is a cross section seen through line A—A in FIG. 1.

In other words, as shown in FIG. 3, a number of concave grooves 19 are formed all over the surface of the inner face of operating ring 17, and at the same time convex grooves 20 which engage with said grooves 19 are formed all over the surface of the outer surface of input ring 18, these concave grooves 19 and convex grooves 20 are made to engage, and input ring 18 is fitted so that it can rotate integrally with operating ring 17.

Between the inner end of said input ring 18 and the side of chuck body 11 corresponding to this is fitted thrust bearing 22 which positions ball holder 21 on the side of chuck body 11. The outer diameter of ball holder 21 is fixed at a gauge which allows rotation relative to operating ring 17.

In addition a locking ring 40 for operating ring 17 is fitted between ball holder 21 and chuck body 11.

Between the inner face of said input ring 18 and the outer face of nut ring 15 is formed ball thread 23 which screw feeds in the direction of the forward thrust of nut ring 15 with rotation of input ring 18 in the direction of clamping.

This ball thread 23 is comprised of thread grooves 24 formed on the inside surface of input ring 18, thread grooves 25 formed on the outer surface of nut ring 15, and balls 27 housed within said thread grooves 24, 25 and retained so as to be able to rotate in retainer 26.

Figure 4:
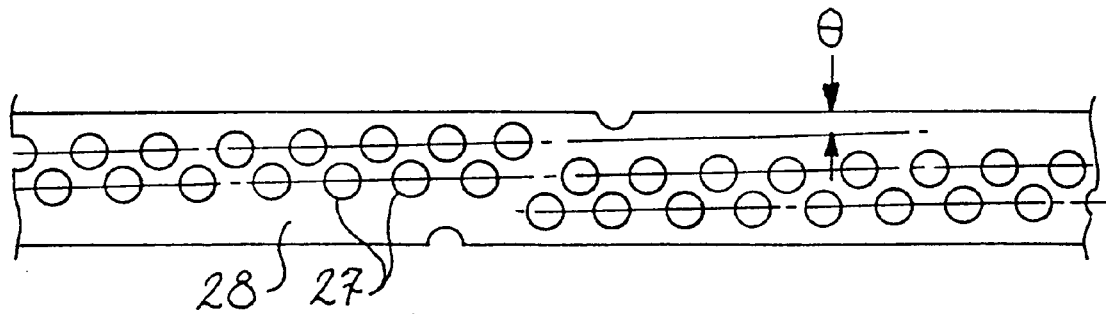
FIG. 4 is a developmental diagram of retainer.

Balls 27, as shown in FIG. 4, are distributed in a zigzag pattern between adjacent screw lines, and formed so that a number of balls 27 can be retained with the screw pitch kept small, and moreover the thread angle θ of the screw lines is made small, it being made smaller than the thread angle of female thread 16 of nut ring 15.

On the inner periphery of said nut ring 15 are formed latch claws 28 of uneven shape in the axial direction, and moreover on the inner surface of ball holder 21 are formed latch claws 29 corresponding to these of uneven shape in a longitudinal direction which engage with said latch claws 28, and when ball holder 21 is fixed, it is possible to lock the rotation of nut ring 15 through the engagement of these latch claws 28, 29.

On the outer edge of said nut ring 15 and the inner side of operating ring 17 facing this is provided return spring 30 which returns said nut ring 15 to its original position when the clamping load on nut ring 15 is released.

Figure 5:
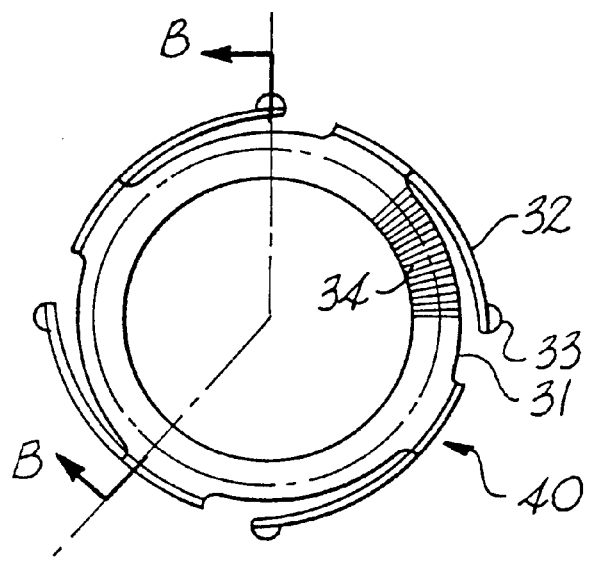
FIG. 5 is a rear view of locking ring.
Figure 6:
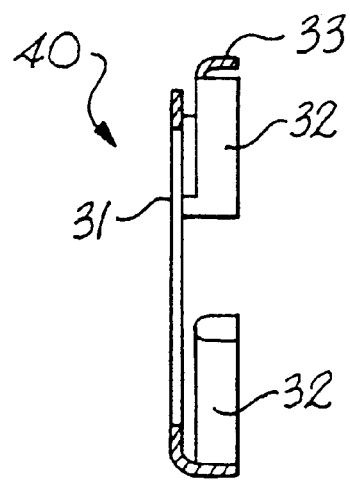
FIG. 6 is a cross section seen through line B—B in FIG. 5.

Said locking ring 40, as shown in FIGS. 5 and 6, is provided with four elastic members 32 on the outer surface of ring base 31, heads 33 being formed on their free ends, with heads 33 engaging elastically with concave grooves 19 formed on the inner surface of said operating ring 17, and when this locking ring 40 is fixed integrally to chuck body 11 it braces the position of operating ring 17 elastically, and prevents it from loosening.

Friction surfaces 34 with an irregular surface are formed on the inside and outside of said ring base 31, the frictional resistance with corresponding parts in contact with these being great and giving a locking effect.

In the same way friction surfaces are formed on the surfaces in contact with ring base 31 of said ball holder 21.

In the figures, 35 is a retainer ring which is pressed into chuck body 11 and acts as a retainer for the attached parts, 36 is a protector ring for return spring 30 which is pressed into chuck body 11, and 37 is a rear cover for chuck body 11.

Nut ring 15 is formed as an integral ring, but even if the conventional two part ring is used, since it can beheld in one piece by the structure of ball thread 23, it is also possible to use this two-part nut ring.

The tool gripping action of a tool chuck 10 having the above structure will now be described.

A tool is inserted with chuck jaws 12 withdrawn inside, and operating ring 17 is manually rotated in the direction of gripping.

Until the chuck jaws 12 grip the tool, the rotation of operating ring 17 rotates nut ring 15 with the latching force of return spring 30, sliding chuck jaws 12 in the closing direction until they grip the tool.

Once the tool is gripped, when the rotation of nut ring 15 stops, the subsequent rotation of operating ring 17 resisting return spring 30 is transformed into screw feed of ball threads 23 formed between input ring 18 and nut ring 15.

In other words with the cessation of rotation of nut ring 15, a relative rotation occurs between this nut ring 15 and input ring 18 which rotates integrally with operating ring 17, and the rotation of input ring 18 creates a rolling movement which causes balls 27 to roll around screw grooves 24, 25 of ball thread 23, and nut ring 15 is screw fed and thrust outwards with the movement of balls 27.

With the screw feed of said ball thread 23, since ball thread 23 is formed in the outside of nut ring 15, the thread gauge of said ball thread 23 can be made large, and for this reason the thread angle can be made small. As a result, since a small amount of screw feed is obtained from a large amount of rotation of input ring 18, the ratio of the amount of screw feed of nut ring 15 to the amount of rotation of the input ring 18 can be made large, resulting in a large amount of torque being obtained.

In addition, the rolling movement of balls 27 in ball thread 23 involves rolling of balls 27, so with screw feed of the ring 15 carried out with balls 27 rotated with a ½ rotation of input ring 18, since balls 27 roll around there is no loss in the rotation input from input ring 18 (the efficiency of rotation transmission is good) and a great increase in torque can be obtained.

With the increased torque obtained by this effect, nut ring 15 is screw fed, said nut ring 15 is forcefully pushed out, and with this pushing out chuck jaws 12 are able to grip powerfully. In other words, since chuck jaws 12 are set obliquely, a wedge effect occurs in chuck jaws 12 and due to this wedge effect the tool can be gripped (clamped) with a powerful force.

With a tool gripped in the fashion described above, even if tool chuck 10 is exposed to vibration, nut ring 15 is held by ball holder 21 of thrust bearing 40 and latch claws 28, 29, and moreover ball holder 21 is pushed up against chuck body 11 and fixed as input ring 18 takes the reaction to the pushing out of nut ring 15, and moreover this fixing is powerful due to the large frictional resistance due to frictional surfaces 34 on the surfaces of contact between ball holder 21 and locking ring 40 and frictional surfaces 34 on surfaces of contact between locking ring 40 and chuck body 11.

As a result, nut ring 15 enters a state where its rotation is locked, and thus even if vibration is applied to tool chuck 10, and even if applied continuously, nut ring 15 will not rotate and loosen its grip due to this rotation, thus enabling a powerful clamping state to be maintained.

In the same way since locking ring 40 is braced against operating ring 17, operating ring 17 will also not loosen with vibration.

When loosening the grip on the tool, it is sufficient to reverse the operation of clamping described above. In this operation, when the grip of nut ring 15 is released, nut ring 15 is returned to its original position by return spring 30.

As a result of the above, according to the embodiment, even without using a chuck handle, it is possible for the tool to be clamped strongly due to the enhanced power of the nut ring thrust.

In addition, power is enhanced by the deceleration caused by the rolling of balls 27 in thread grooves 23, and the absence of rotational loss and efficient transmission of rotation due to the rolling of balls 27, thus creating a powerfully enhanced grip.

Furthermore, when using a gripped tool, the rotation of nut ring 15 is locked and so even if vibration is applied, and even if continuous vibrational load is present, there is no loosening of the clamping of the tool and it is particularly effective in work which creates vibration such as drilling a concrete wall.

Nut ring 15 may be constructed so that the front end of its inner diameter and the screw head of female thread 16 is directly supported by the outer diameter of chuck body 11, and moreover, although thrust bearing 22 combines the outer retainer in the inner edge of input ring 18, this structure may be formed such that there is a separate and independent thrust bearing 22.

What is claimed is:

1. A tool chuck which is a tool chuck which in addition to being provided at the center of a chuck body with a plurality of chuck jaws set obliquely and able to slide open and shut, has a partial male thread engraved around the outside of said chuck jaws, and is provided with a nut ring which screws onto this partial male thread and which screw feeds said chuck jaws in the direction of opening and closing, the rotational force of an operating ring fitted onto said chuck body being transmitted to said nut ring, each chuck jaw sliding in the direction of opening and closing, the tool being gripped by the closing of said chuck jaws, an input ring being fitted into and fixed to the inner surface of said operating ring facing the nut ring, a thrust ring being fitted between the inner side of said input ring and the chuck body which positions a ball holder on the chuck body side, a ball thread being formed between the inner face of said input ring and the outer face of the nut ring opposing it, which screw feeds the nut ring in the direction of thrust upon rotation of the input ring in the direction of clamping by means of the balls held in a retainer, the inner end of said nut ring engaging with the inner surface of said ball holder, and having a return spring fitted between said operating ring and nut ring, and which returns said nut ring when the clamping load of the nut ring is released.

* * * * *